United States Patent [19]

Rebmann et al.

[11] Patent Number: 4,690,668
[45] Date of Patent: Sep. 1, 1987

[54] METHOD AND APPARATUS FOR MAKING A BUTT SEAM HAVING A COVER STRIP ON A TUBE OF MULTI-LAYER PACKAGING MATERIAL

[75] Inventors: Manfred Rebmann, Weinstadt; Helmut Weigold, Stuttgart, both of Fed. Rep. of Germany

[73] Assignee: Robert Bosch GmbH, Stuttgart, Fed. Rep. of Germany

[21] Appl. No.: 875,898

[22] Filed: Jun. 18, 1986

[30] Foreign Application Priority Data

Oct. 10, 1985 [DE] Fed. Rep. of Germany ....... 3536172

[51] Int. Cl.⁴ .............................................. B31C 1/06
[52] U.S. Cl. .................................... 493/297; 156/203; 219/8.5; 493/193; 493/210; 493/302
[58] Field of Search ............... 493/193, 198, 206, 207, 493/209, 210, 292, 294, 297, 302, 381, 382, 383, 384, 385, 393; 156/203, 275.1, 380.1, 466; 219/8.5, 10.53, 59.1

[56] References Cited

U.S. PATENT DOCUMENTS

| | | | |
|---|---|---|---|
| 3,131,285 | 4/1964 | Kohler et al. | 219/8.5 |
| 4,210,477 | 7/1980 | Gillespie et al. | 219/8.5 |
| 4,478,670 | 10/1984 | Hegse et al. | 493/302 |
| 4,563,231 | 1/1986 | Porrmann et al. | 156/203 |

FOREIGN PATENT DOCUMENTS 2653753 6/1978 Fed. Rep. of Germany .

Primary Examiner—Frederick R. Schmidt
Assistant Examiner—Robert Showalter
Attorney, Agent, or Firm—Edwin E. Greigg

[57] ABSTRACT

A method and an apparatus for heat welding a butt seam on a tube of packaging material, in which the welding heat is generated by applying a high-frequency alternating electromagnetic field of a pair of induction coils. To prevent current arcing at the cut edges of a metal inlay of the packaging material in the vicinity of the abutting edges of a sheet of packaging material, the edges are guided spaced apart from one another by a predetermined distance. To this end, the apparatus has a separating blade, which in the operative range of the electromagnetic alternating field protrudes in between the abutting edges of the sheet of packaging material and between the induction coils.

3 Claims, 3 Drawing Figures

METHOD AND APPARATUS FOR MAKING A BUTT SEAM HAVING A COVER STRIP ON A TUBE OF MULTI-LAYER PACKAGING MATERIAL

BACKGROUND OF THE INVENTION

The invention is based on a method and apparatus for making a butt seam having a cover strip on a tube of multi-layer packaging material. In a method of this kind, known for instance from German Offenlegungsschrift No. 26 53 753, the long edges of a sheet of packaging material are placed together and then, abutting one another, pass through an alternating electrical field of an induction coil to apply a cover strip along the seam. In this method, it happens again and again that the edges of the metal inlay embedded between nonconductive layers will come into physical contact with one another at various locations, especially where there are protruding cut corners. At these locations, because of the alternating electrical fields, arcing can occur, in the form of sparks, which burn holes especially in the thermoplastic protecting layer resting on the metal inlay. This phenomenon in the area of the longitudinal seam also occurs if a lid is welded or heat-sealed by an induced alternating electrical field onto a tubular piece of packaging material embodied in this way and manufactured by the above-described method. In a package of this kind which contains liquid, the liquid may leak through at the burned-through locations, which are hardly visible from the outside, and premeate the supporting layer of the packaging material, which may for instance be of cardboard, and increase the size such as ballooning if the package is stored for a period of time. If the burned holes are large enough, the liquid can even escape to the outside. Packaging container leaks of this kind are highly undesirable, however, because not only do they make the defective package itself unsalable, but other packages that may be joined to it in a pack are soiled as well.

OBJECT AND SUMMARY OF THE INVENTION

In the method according to the invention, a narrow gap is made between the abutting edges of the sheet of packaging material, which prevents sparkover. In an advantageous apparatus for performing the method according to the invention, this gap is made by a thin separating blade of nonconductive material, which further contributes to preventing sparkover.

Other advantages are also attainable with the apparatus described herein. It is particularly advantageous to dispose the separating blade in a jaw that also holds the induction coil.

The invention will be better understood and further objects and advantages thereof will be more apparent from the ensuing detailed description of preferred embodiments taken in conjunction with the drawings.

DESCRIPTION OF THE PREFERRED EMBODIMENTS

Figure 1:
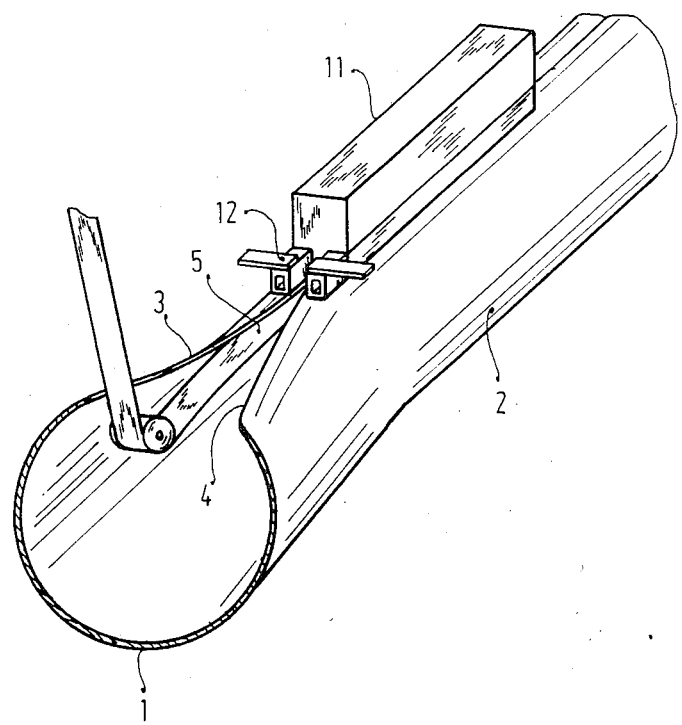
FIG. 1, in a simplified perspective view, shows an apparatus for manufacturing a tube of packaging material.
Figure 2:
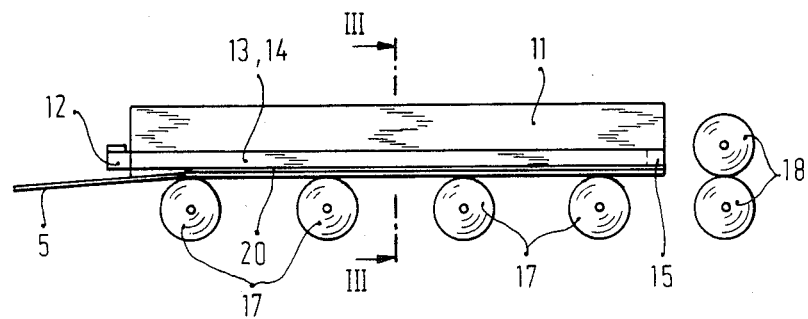
FIG. 2 shows a side view of the apparatus of FIG. 1.
Figure 3:
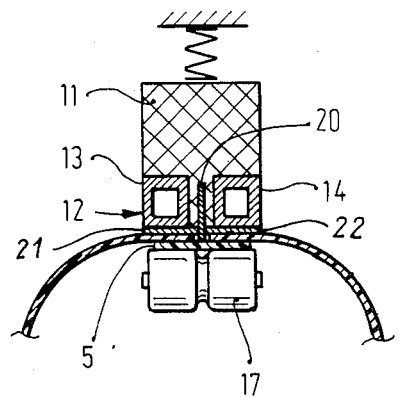
FIG. 3 shows the apparatus of FIG. 1 in a cross section taken along the plane III—III of FIG. 2.

A sheet of packaging material 1, which is unwound from a supply roller, is shaped into a cylinder or tube 2, so that its edges 3, 4 substantially abut one another. To join the two edges 3, 4 together, a cover strip 5 is guided in such a way that it spans the underside of the butt seam in the interior of the tube 2, in the vicinity of the edges 3, 4. By welding the cover strip 5 to the peripheral areas adjoining the edges 3, 4, a firm and tight longitudinal seam is produced. The sheet of packaging material 1 is for instance a multilayer material; its layers, from the outside in, are a supporting layer of cardboard, a sealing layer of aluminum foil and an inner protective layer of some thermoplastic plastic, such as polyethylene. The cover strip 5 is preferably multi-layered as well; it has a supporting layer of polypropylene or polyamide and a welding layer of polyethylene, which is put into physical contact with the protective layer of the sheet of packaging material 1, in the inner peripheral areas thereof, and pressed against them and then, by supplying heat to it, firmly welded thereto. The term "welding" used above and hereinafter should not be construed in a limited sense and is intended to encompass the term "heat-sealing", a term which is often used in the packaging industry, as well.

To generate the heat required for continuous welding of the welding layer of the cover strip 5 to the protective layer of the sheet of packaging material 1, an induction coil 12 is associated, on the outside of the tube 2, with the abutting edges 3, 4 of the sheet of the packaging material 1; this coil 12 is connected to an alternating-current generator. The induction coil 12 takes the form of a U-shaped loop having two legs 13, 14 extending parallel to one another and a connecting portion. The two legs 13, 14 of the induction coil 12 are arranged in the jaw 11 in such a way that they overlap the abutting edge areas of the sheet of packaging material 1 and the cover strip 5, which is approximately 10 mm wide. By supplying a high- or medium-frequency alternating current to the induction coil 12, an alternating electromagnetic field is generated about the legs 13, 14 of the coil 12, which in the adjoining areas of the metal sealing layer of the strip of packaging material 1 is located adjacent to the edges 3, 4 and induces electromagnetic eddy currents through the sealing layer. The energy of the eddy currents is converted into heat, which from the sealing layer is also transmitted to the adjoining protective layer and the welding layer of the cover strip 5. The thermoplastic layers, which become dough-like in consistency from the heat, are joined together by the resilient pressure between the jaw 11 and rollers 17 disposed coincidently with the jaw, as well by a pair of rollers 18 disposed following the jaw 11; thus, after cooling, the thermoplastic layers create a firm bond between the abutting edge areas of the sheet of packaging material 1 and the cover strip 5.

To prevent current arcing in the form of sparks between the abutting edges of the metal layer of the sheet of packaging material 1 during the action of the high-frequency alternating electromagnetic field, the edges 3, 4 of the sheet of packaging material 1 are guided toward one another spaced apart by a predetermined, slight distance in the vicinity of the butt seam by a separating jaw 11. To this end, the separating blade 20 is provided in the jaw 11, which protrudes in rib-like fashion over the entire length of the jaw 11, to the depth of the thickness of the sheet of packaging material 1, from the side of the jaw 11 facing the edge areas of the sheet of packaging material 1. The separating blade 20, which is approximately 0.6 mm thick, comprises a nonmagnetizable, nonconductive material, preferably ceramic, for instance aluminum oxide. The separating blade 20 preferably protrudes farther outward from the underside of the welding jaw 11 at the end where the sheet of packaging material 1 enters the jaw 11 than at the other end where the sheet emerges from the jaw again. When the tube 2 is formed from the sheet of packaging material 1, the separating blade 20 forms a narrow gap in between the edges 3, 4 where they substantially abut, and prevents sparkover between the edges of the metal sealing layer of the sheet of packaging material 1. The separating blade 20 is disposed in the plane of symmetry of the two legs 13, 14 of the induction coil 12. Because this blade is preferably of ceramic, it has an electrically insulating effect and moreover undergoes little wear. To keep wear of the induction coil 12 and of the side of the jaw 11 that comes into contact with the sheet of packaging material 1 to a low level, thin liners 21, 22 of ceramic material are secured to the underside of the two legs 13, 14 of the induction coil 12.

To avoid excessive heating of the jaw 11 and induction coil 12 during long-term operation of the apparatus, the induction coil 12 is shaped from a hollow profile, through which a liquid coolant is passed. In the above-described exemplary embodiment, the induction coil 12 is embodied as a simple, U-shaped loop, but it may also have some other shape within the scope of the invention.

It is additionally noted that a cover strip that spans the butt seam of the edges 3, 4 may instead be welded onto the outside of the tube 2 rather than on its inside, or both.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A method for making a butt seam on a multi-layered sheet of packaging material 1 having an inlay of metal and at least one outer layer of a thermoplastic which comprises forming said multi-layered sheet of packaging material into a tubular shape with substantially abutting longitudinal edges 3 and 4, positioning and guiding said formed tubular shape of material with its edges 3 and 4 juxtaposed a pair of fixed induction coils placed so that the edges 3 and 4 are adjacent to each other, extending a separating blade downward between said fixed pair of induction coils and between said edges 3 and 4, placing a thermoplastic cover strip 5 beneath said edges 3 and 4 pressing said cover strip onto an inner surface of said tubular shaped sheet of packaging material and welding said cover strip to said edges 3 and 4 by use of said pair of fixed induction coils placed juxtaposed said edges 3 and 4 of said formed tubular shaped packaging material as said tubular shaped sheet of packaging material and said cover strip travel continuously past said pair of fixed induction coils and are pressed together.

2. An apparatus for welding a thermoplastic strip to adjacent edges of a tubular shaped tube formed of a multi-layered sheet of packaging material, comprising a pair of parallel fixed induction coils spaced from each other and positioned relative to said adjacent edges of said tubular shaped tube for welding said strip to said edges, and a separating blade which protrudes downwardly between said pair of induction coils in a plane of symmetry therebetween and between said adjacent edges to slightly separate said edges from each other during passage along said pairs of parallel fixed induction coils, and roller means for forcing a cover strip onto an inner surface of said tubular shaped tube.

3. An apparatus as defined by claim 2, wherein said separating blade is formed of an electrically insulating material.

* * * * *